Feb. 27, 1934.    G. H. CURTISS    1,948,744
MOTOR VEHICLE
Filed July 9, 1929
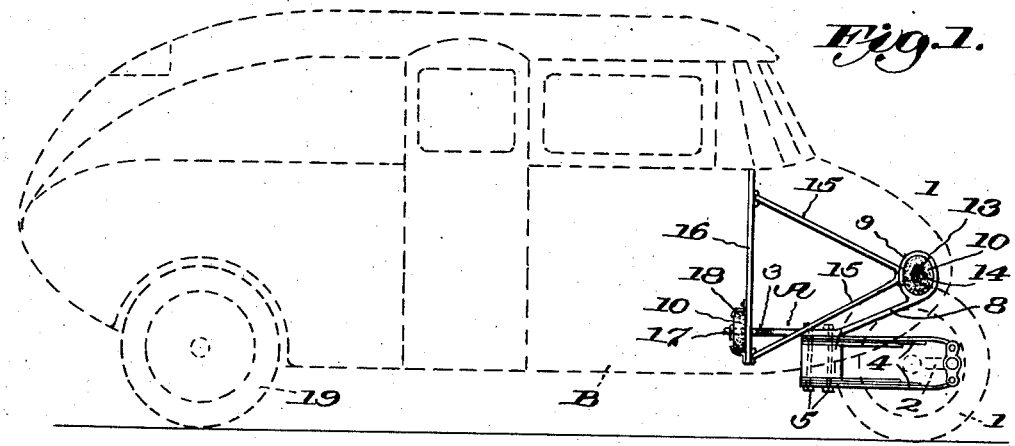
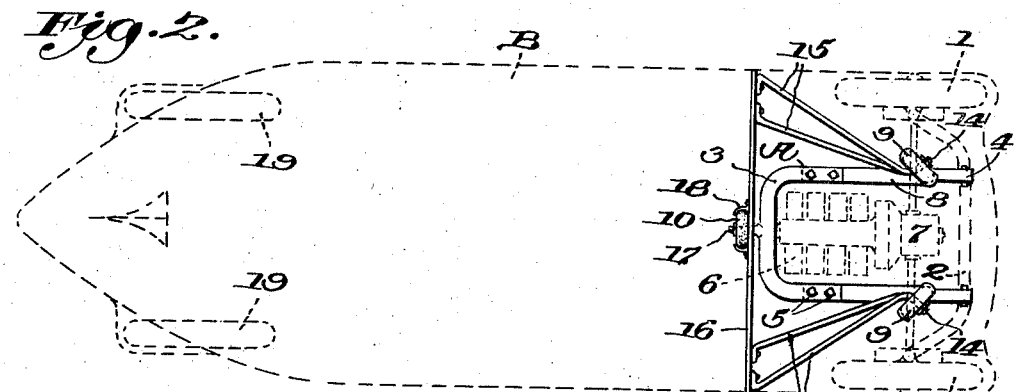
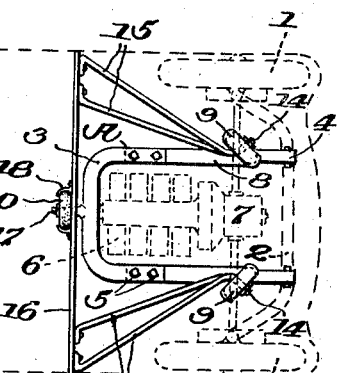
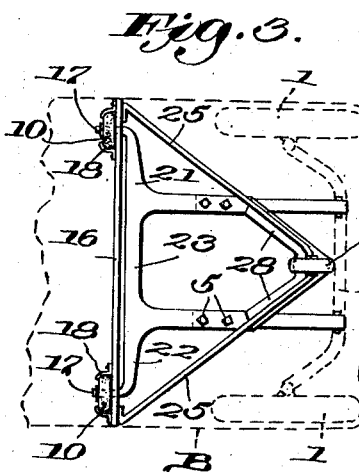
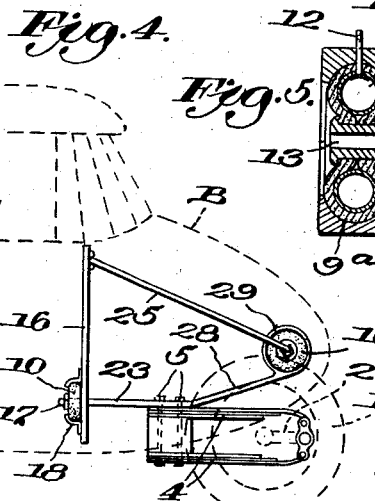
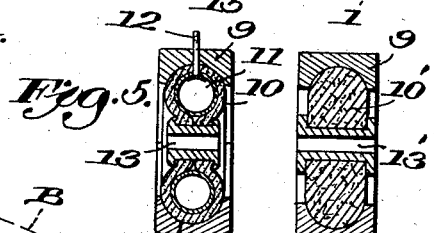
Inventor
Glenn H. Curtiss,
By Stone, Boyden, Mack & Hahn,
Attorneys.

Patented Feb. 27, 1934

1,948,744

UNITED STATES PATENT OFFICE 1,948,744

MOTOR VEHICLE

Glenn H. Curtiss, Country Club Estates, Fla.; Lena P. Curtiss sole executrix and trustee of estate of said Glenn H. Curtiss, deceased Application July 9, 1929. Serial No. 376,985

REISSUED

14 Claims. (Cl. 180—12)

This invention relates to motor vehicles, and more particularly to a coupling or suspension means for the bodies thereof whereby vibration is greatly reduced.

As ordinarily constructed, the motor and the body of a passenger automobile are mounted on the same rigid frame or chassis, and with such an arrangement the passengers are subjected to all of the shocks and vibration incident to the operation of the power plant, as well as to road shocks.

An object of the present invention is to provide a construction which shall effectually prevent such transmission of shocks and vibration from the power plant to that part of the vehicle occupied by passengers, so that while the vehicle may be controlled and steered from the passenger compartment in the usual way, the occupants will be conveyed as smoothly as though rolling along without any propelling power.

Another object is to lessen the effect on the automobile body of shocks due to irregularities of the road, by providing special means for absorbing such shocks.

To this end, I propose to construct the body and the propelling and steering mechanism as two separate units, and to connect these units wholly by yieldable coupling members or cushions, preferably of annular form, so that neither road shocks nor the vibrations set up in the power unit will be transmitted to the body unit.

The herein described construction serves to further reduce road shocks because it provides a yielding truss between the front and rear ends of the vehicle. One reason that this yieldability is permissible in the vehicle of the present invention is due to the fact that the motor is located at that end of the vehicle where the power is applied to the wheels. On the other hand the yieldable feature might not be so desirable in a structure where the engine is at one end of the body and the driven wheels are at the opposite end because the transmission mechanism and the propeller shaft might be unduly strained by relative movement between the engine and the wheels.

Specifically, I propose to mount the power plant wholly upon the two front wheels of the vehicle, and to support one end of the body on this two wheeled power plant by coupling devices of the above character arranged so that they will prevent the transmission of vibrations, and permit relative transverse oscillating or teetering movement, and at the same time will form a directionally stable connection between the two units, whereby the power unit may be controlled from the body unit.

In order that the invention may be clearly understood, reference is had to the accompanying drawing, forming part of this specification, and illustrating the invention more or less conventionally, in which drawing:—

Figure 1 is a side elevation showing in dotted lines the outline of a motor vehicle, and in full lines my improved means for coupling the power unit and the body unit;

Figure 2 is a plan view thereof;

Figures 3 and 4 are fragmentary views corresponding respectively to Figures 2 and 1, and showing a slightly modified arrangement of coupling means;

Figure 5 is a vertical transverse section on an enlarged scale, through one of my improved coupling members, embodying a pneumatic tube; and Figure 6 is a similar view of a coupling embodying a solid annulus of rubber or similar elastic material.

Referring to the drawing in detail, and more particularly to Figures 1, 2 and 5, the front truck or power unit of the vehicle is indicated in its entirety at A and the body unit is shown in dotted lines at B.

The power unit comprises a pair of supporting wheels 1 mounted at the ends of a suitable axle 2. A U-shaped frame 3 constituting part of the power unit, has secured to the ends thereof, as by means of bolts 5, pairs of quarter elliptic springs 4, the free ends of which are secured to the axle 2 in any suitable way.

The motor itself, which may be of any suitable type, is shown in dotted lines at 6 and may be arranged to transmit power to a differential 7, from which extend the usual live axles to the wheels 1. It will be understood, however, that the details of arrangement of the motor and transmission and driving mechanism form no part of my present invention.

Secured to each end of the frame 3, either by bolts or by being formed integral therewith, is an upwardly and forwardly extending member 8, carrying at its free end a circular rim element 9, having an internal concave seat 9ª, as clearly shown in Figure 5. Enclosed within this rim element 9 is a pneumatic cushion member, shown in Figure 5 as in the nature of an ordinary tire shoe or casing 10 having enclosed therein an inner tube 11 provided with an inflation valve 12.

Fitted in the center of this annular pneumatic cushioning device it a hub or socket element 13, having an axial bore. In this bore or socket is received a stud or pin 14, carried at the meeting ends of a bifurcated frame member 15. The legs of this frame member diverge rearwardly and are secured at their ends to widely separated points of a plate or frame 16 carried by and forming a part of the body unit. It will be observed that the annular cushioning devices 10 and rims 9, above described, are disposed in a vertical plane, and are shown as lying at an angle to the axis of the vehicle. This is merely for convenience, in making the connections shown. Other arrangements and dispositions of these coupling devices can readily be employed without departing from the spirit of my invention.

Extending rearwardly from the frame 3 is a pin or stud 17. This fits in the socket member 18 of a third annular cushioning member 10, such member being carried by the rim elements or lugs 18 secured to the plate or frame 16.

From the foregoing, it will be seen that I have provided what may be called a three-point connection between the power unit and the body unit, this connection comprising three spaced yielding coupling members arranged in triangular relation. It will be noted that at each one of these three points, an annular cushioning member is interposed between an element carried by the power unit and a cooperating element carried by the body unit, and that these yieldable couplings or cushioning members constitute the sole connection between the power unit and the body unit. It will thus be obvious that vibrations set up in the power unit are absorbed by the cushioning devices, and are therefore not transmitted to the body unit.

It will also be seen that the coupling members described provide a readily detachable connection between the two units. All that is necessary is to remove or disengage the studs 14 and 17 from the sockets of the respective coupling devices 10, when the two units may be immediately separated, by moving one longitudinally of the other.

It will be further apparent that by means of these yielding coupling devices, not only is tractive effort transmitted from the power unit to the body unit, but the latter is supported on the former, in a directionally stable manner.

In fact, each unit, which is itself unstably mounted on two or more road wheels, serves to support the other, and while the yielding couplings above described provide a directionally stable connection between the units, they permit relative transverse or teetering movement, so that shocks due to irregularities of the road are not transmitted to the body.

This shock absorbing characteristic is due in part to the mass or inertia of the motor and associated parts. This mass, which acts as a shock dampener, is carried on springs, and on the usual penumatic tires, these elements constituting primary and secondary shock absorbing means. The above described yielding cushions or coupling devices constitute tertiary shock absorbing means, and these, it will be seen, are disposed between the power unit and the body unit, and are in addition to the springs and tires and provide a cushioning effect of the same order of magnitude. Thus, before reaching the body, road shocks must pass in series through the tires, springs, mass of the motor, and the yielding coupling devices, this fact greatly increasing the smooth riding qualities of my improved vehicle. It may be pointed out that while the above has reference to wheel shocks in transverse planes, the tertiary cushioning devices are equally effective in absorbing shocks in a longitudinal plane. This is due to the fact that the annular cushioning devices are in the nature of universal joints, permitting limited relative movement in any direction whatsoever.

It will be observed that, in the above described arrangement, two of the cushioning devices lie in substantially the same vertical transverse plane as the axle of the power unit. These permit transverse teetering in the same manner as do the wheel tires and springs. The third cushioning device is disposed in the longitudinal plane of symmetry of the vehicle, thus freely permitting the foregoing teetering action, the same as if the power unit were pivoted on a longitudinal axis.

The body unit itself may be of any desired type or construction, and is supported at the rear on its own wheels 19, any desired springs being interposed between such wheels and the body. It will be further understood that a driver's seat is arranged at the front of the body unit, and that the power unit can be controlled from this seat by any suitable means (not shown).

In Figures 3 and 4, I have shown a slightly modified method of providing the above mentioned three-point connection, between the power unit and the body unit. In these figures, I have illustrated a bifurcated member 28 secured to the frame 23 of the power unit, and carrying at its forward end a rim element 29. Instead of the two bifurcated frames 15, shown in Figure 1, I employ in the present modification a single bifurcated or triangular frame 25, the apex of which passes through the socket member corresponding to the rim element 29, the ends of the frame 25 being secured to the plate or frame 16.

Instead of a single stud 17, as in Figure 1, I employ in Figures 3 and 4 a pair of such studs, spaced widely apart and carried at the ends of arms 21 and 22, extending from the frame 23. Rim elements or lugs 18 are provided adjacent each stud 17, as before.

It is clear that with this arrangement, there is likewise formed a three-point connection, two of the points being at the rear and one in front, this arrangement being the reverse of that shown in Figure 2, in which two points of connection are disposed at the front and a single point at the rear. Other modifications will no doubt suggest themselves to those skilled in the art.

In this arrangement of Figures 3 and 4, it will be observed that two of the yielding coupling devices lie as before substantially in the same transverse vertical plane, and the third is disposed in the longitudinal plane of symmetry of the vehicle, thus giving rise to the same advantages as previously described.

Furthermore, with either arrangement of three-point suspension, shock movement occurring at any one point serves to oscillate the power unit about the other two, relative to the body unit.

Finally, in both modifications, it will be noted that some, at least, of the yielding couplings or cushioning devices are located well above the motor and front axle, thus giving increase stability.

Thus, in Fig. 1, it will be seen that the forward cushioning devices, located adjacent the front end of the motor, are disposed well above the axis of the motor and substantially higher than the cushioning device located at the rear of the motor, and similarly in Fig. 4, the front cushion is located above the motor axis at a relatively high point as compared with the rear cushions. In either case, therefore, the front and rear cushioning devices lie in a rearwardly and downwardly inclined plane, and this contributes to the stability and shock-absorbing qualities of the arrangement.

Instead of employing a pneumatic cushioning device, as shown in Figure 5, I may use the cushioning device illustrated in Figure 6, in which, instead of the pneumatic tube 10, I have shown a solid annulus 10', of rubber, or similar elastic material, having a socket member 13' fixed therein.

While I have illustrated and described certain more or less specific constructions, it will be understood that these have been shown only for the purpose of illustrating the principle of the invention, namely, the complete insulation of the power unit from the body unit, so far as any rigid connection is concerned. Many other embodiments may obviously be made, without departing from the spirit of the invention or the scope of the appended claims.

What I claim is:

1. In a motor vehicle, a body unit and a two-wheeled power unit having an axle, and a plurality of spaced yieldable coupling members constituting the sole connection between said units, all of said members lying above said axle, and some being disposed in the same transverse plane.

2. In a motor vehicle, a body unit and a two-wheeled power unit, a three-point connection between said units, and a cushion interposed between the respective elements at each connection point, and yieldable in all directions.

3. In a motor vehicle, a body unit and a power unit, each having two wheels, and means for connecting said units so that they support each other, said connecting means comprising a rim element carried by one unit, a hub or socket element carried by the other unit, and an annular cushioning member interposed between said elements and disposed in a vertical plane.

4. A passenger automobile comprising separable body and power units, each unstably supported on wheels, vehicle springs and wheel tires constituting primary and secondary shock absorbing means in connection with said power unit, and tertiary shock absorbing means of the same order as said tires and springs interposed between said power unit and body unit and constituting the sole means for connecting the one with the other.

5. An automobile comprising a body unit, a power unit unstably road mounted on wheels and deriving its stability through connection to the body unit, said power unit comprising a motor and springs by which said motor is supported on said wheels, and a shock absorbing stabilizing and tractive connection, exclusive of said springs between the body unit and power unit through which the power unit partakes of movement independently of and prior to the body unit, as such movement is induced by road shocks.

6. A passenger automobile comprising a body unit and a power unit, which latter includes a motor and springs on which said motor is supported, said power unit being unstably road mounted on wheels and deriving its stability through connection with the body, and shock absorbing stabilizing and traction connecting means between the power unit and the body unit independent of said springs and having the shock absorbing qualities of a pneumatic automobile tire.

7. An automobile comprising body and power units independently road supported, said power unit unstably supported and comprising a motor, wheel tires and axle suspension springs, said tires and springs shock absorbing the power unit per se, and a tertiary shock absorbing connection exclusive of said springs and of an order of magnitude approaching the tires and the springs interposed between the power unit and the body unit, whereby such shocks as pass the tires and the springs are damped in large part by the inertia of the motor and are absorbed altogether in said tertiary means.

8. A passenger automobile comprising a body unit and a power unit independently and unstably road supported, and shock absorbing and stabilizing couplings constituting the sole connection between the power unit and the body unit affording longitudinal directional stability between the units but substantially freely permitting limited relative transverse movement between the units.

9. In a motor vehicle, a body unit, a power unit comprising a motor, an axle carrying driving wheels, and springs supporting said motor on said axle, and yieldable coupling means, independent of said springs, for transmitting tractive effort from said power unit to said body unit, and for supporting the latter on the former, said means constituting the sole connection between said units.

10. In a motor vehicle, a body unit and a two wheeled power unit having an axle, a motor, and springs by which the motor is suspended from said axle, and means independent of said springs for connecting said units, said connecting means comprising a plurality of spaced, yieldable coupling members.

11. In a motor vehicle, a body unit and a two wheeled power unit having an axle, a motor, and springs by which the motor is suspended from said axle, and means independent of said springs for supporting said body unit on said power unit and comprising a plurality of spaced, yieldable coupling members.

12. In a motor vehicle, a body unit and a two wheeled power unit having an axle, a motor, and springs by which the motor is suspended from said axle, and means independent of said springs for supporting said body unit on said power unit and comprising a plurality of spaced, yieldable coupling members, said coupling members constituting the sole connection between said units.

13. An automobile comprising body and power units, independently road supported, said power unit being unstably supported and comprising wheels and axle and a motor spring-suspended from said axle, and relatively large shock-absorbing stabilizing connections, independent of such spring suspension, interposed between the power unit and the body unit.

14. An automobile comprising independent body and power units, said power unit comprising an axle, a pair of driving wheels carried thereby, and a motor spring-suspended from said axle independently of the body and connected with said driving wheels, and means for attaching said units together, said means including a pivotal connection at the rear of said power unit and lying in the plane of the longitudinal axis of said body unit, about which pivot one unit may teeter relative to the other.

GLENN H. CURTISS.